United States Patent
Hahn

(10) Patent No.: US 11,919,018 B2
(45) Date of Patent: Mar. 5, 2024

(54) DEVICE FOR THE VOLUME-CONTROLLED PORTIONING OF CLEANING FLUID

(71) Applicant: Continental Automotive GmbH, Hannover (DE)

(72) Inventor: Torsten Hahn, Frankfurt am Main (DE)

(73) Assignee: CONTINENTAL AUTOMOTIVE GMBH, Hannover (DE)

( * ) Notice: Subject to any disclaimer, the term of this patent is extended or adjusted under 35 U.S.C. 154(b) by 607 days.

(21) Appl. No.: 16/973,895

(22) PCT Filed: Jun. 13, 2019

(86) PCT No.: PCT/EP2019/065500
§ 371 (c)(1),
(2) Date: Dec. 10, 2020

(87) PCT Pub. No.: WO2019/243153
PCT Pub. Date: Dec. 26, 2019

(65) Prior Publication Data
US 2021/0252540 A1 Aug. 19, 2021

(30) Foreign Application Priority Data
Jun. 18, 2018 (DE) ...................... 10 2018 209 803.4

(51) Int. Cl.
*B05B 12/06* (2006.01)
*G01F 11/02* (2006.01)
(Continued)

(52) U.S. Cl.
CPC ............ *B05B 12/06* (2013.01); *G01F 11/021* (2013.01); *B60S 1/481* (2013.01); *B60S 1/56* (2013.01)

(58) Field of Classification Search
CPC ............................... B05B 12/06; G01F 11/021
(Continued)

(56) References Cited

U.S. PATENT DOCUMENTS 3,059,857 A   10/1962  Friant et al.
4,223,838 A *  9/1980  Maria-Vittorio-Torrisi ................
                                           A01G 25/023
                                              239/533.1
(Continued)

FOREIGN PATENT DOCUMENTS

CN   201376560 Y   1/2010
CN   102574298 A   7/2012
(Continued)

OTHER PUBLICATIONS

Chinese Office Action for Chinese Application No. 201980040684. 9, dated Nov. 2, 2021 with translation, 13 pages.
(Continued)

*Primary Examiner* — Lien M Ngo
(74) *Attorney, Agent, or Firm* — BUCHANAN INGERSOLL & ROONEY PC

(57) ABSTRACT

An apparatus for volume-controlled portioning of cleaning fluid, having a housing and having a piston unit which is arranged displaceably in the housing and which displaces a cleaning fluid from a chamber into an outflow channel. In order to provide an improved apparatus, which permits exact portioning with reduced temperature dependency and in a cleaning sequence which is as quick as possible. It is proposed that the piston unit includes a piston body and at least one valve device which is arranged on the piston body and which ensures that the chamber is filled with the cleaning fluid during the reverse movement of the piston unit.

11 Claims, 1 Drawing Sheet

(51) Int. Cl.
  *B60S 1/48* (2006.01)
  *B60S 1/56* (2006.01)

(58) Field of Classification Search
  USPC .......... 222/71, 496, 494, 450; 239/104–119, 239/205, 206, 570
  See application file for complete search history.

(56) References Cited

U.S. PATENT DOCUMENTS

| | | | |
|---|---|---|---|
| 5,605,286 A | 2/1997 | Orth et al. | |
| 8,322,632 B2 | 12/2012 | Walter | |
| 8,561,711 B2* | 10/2013 | Karalis | A62C 37/46 169/46 |
| 8,967,495 B2* | 3/2015 | Hamza | B60S 1/528 239/570 |
| 2007/0235559 A1* | 10/2007 | Miyake | F16K 1/12 239/203 |
| 2015/0190852 A1 | 7/2015 | Saint | |
| 2016/0271634 A1 | 9/2016 | Robert | |

FOREIGN PATENT DOCUMENTS

| | | |
|---|---|---|
| CN | 104520023 A | 4/2015 |
| DE | 2300045 A1 | 7/1974 |
| DE | 4105379 A1 | 8/1992 |
| DE | 4416924 A1 | 11/1995 |
| DE | 102016208093 A1 | 11/2017 |
| DE | 102018209372 A1 | 12/2019 |
| EP | 2704928 B1 | 12/2015 |
| FR | 2974778 A1 | 11/2012 |
| WO | 2017194062 A1 | 11/2017 |

OTHER PUBLICATIONS

International Search Report and Written Opinion for International Application No. PCT/EP2019/065500, dated Sep. 23, 2019, with partial English translation, 14 pages.
International Search Report and Written Opinion for International Application No. PCT/EP2019/065500, dated Sep. 23, 2019, 12 pages (German).
German Search Report for German Application No. 10 2018 209 803.4, dated Jun. 3, 2020, with partial English translation, 7 pages.

* cited by examiner

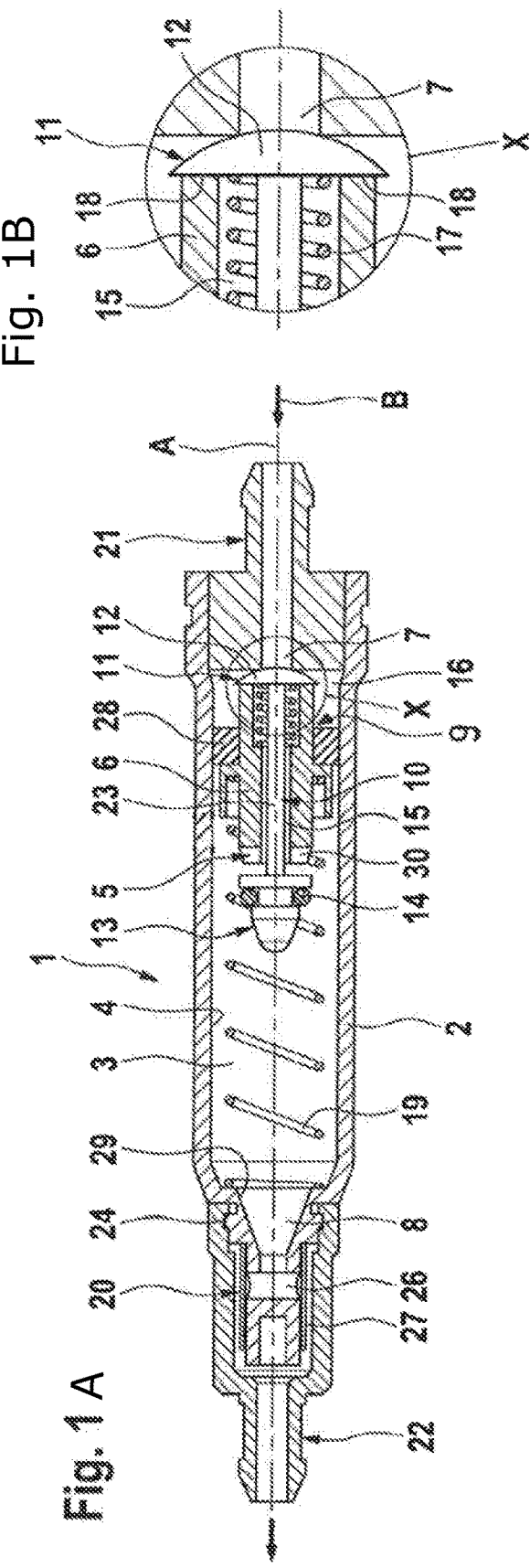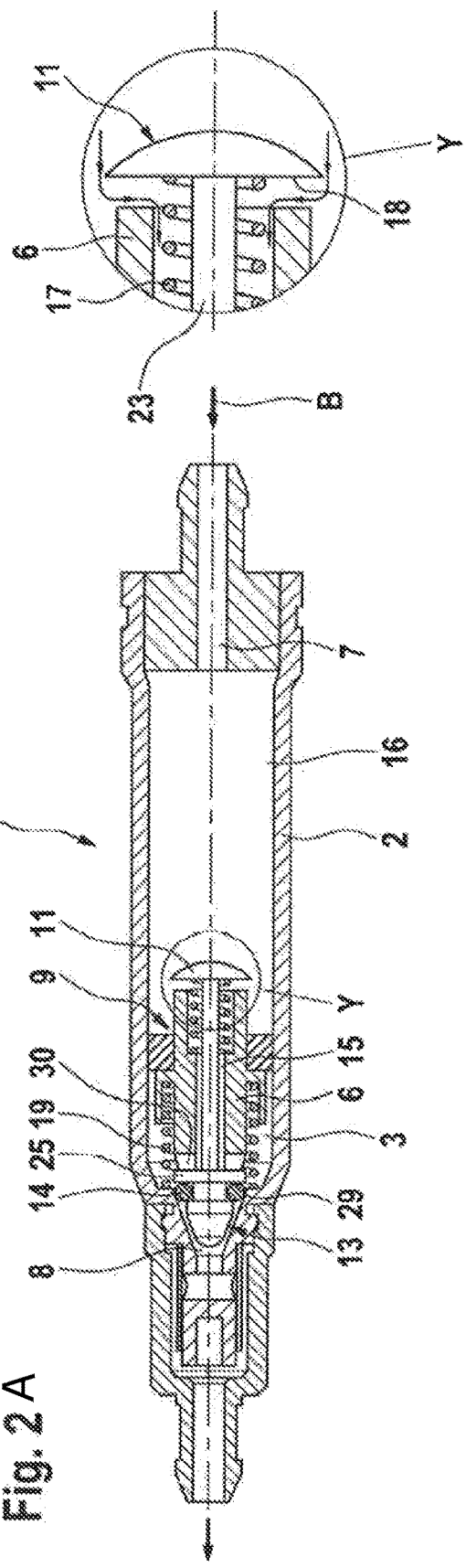

DEVICE FOR THE VOLUME-CONTROLLED PORTIONING OF CLEANING FLUID

CROSS REFERENCE TO RELATED APPLICATIONS

This application is the U.S. National Phase application of PCT International Application No. PCT/EP2019/065500, filed Jun. 13, 2019, which claims priority to German Patent Application No. 10 2018 209 803.4, filed Jun. 18, 2018, the contents of such applications being incorporated by reference herein.

FIELD OF THE INVENTION

The invention relates to an apparatus for volume-controlled portioning or dosing of cleaning fluid for a cleaning system installed in a motor vehicle, in particular for use for cleaning optical or optoelectronic appliances, in particular cameras for detecting vehicle surroundings in partly or fully autonomous vehicle control systems. Apparatuses of said type serve for targeted delivery in bursts of amounts, fixed in a defined manner, of an in particular aqueous cleaning fluid, whereby a particularly economical use of the cleaning fluid is achieved.

BACKGROUND OF THE INVENTION

For this purpose, in the generic apparatuses, the cleaning fluid is displaced from a chamber by a pressure difference-actuated piston, wherein the volume of the chamber, which is delimited by the piston, structurally defines the dosing volume or the portion of cleaning fluid that is to be delivered by one or more downstream nozzles during a cleaning process or sequence or burst.

Apparatuses of said type are known for example from WO 2017194062 A1, incorporated by reference herein. Therein, when a conveying device—for example a pump—arranged upstream of the apparatus is activated, the fluid pressure before the piston is increased such that the latter is displaced into the chamber owing to the pressure difference formed and displaces the cleaning fluid from the chamber into a downstream hydraulic line to a spray nozzle. After deactivation of the conveying device, the pressure before the piston drops and the latter is displaced back into its initial position. In the process, the chamber is refilled with the cleaning fluid by way of a defined internal leak—for example a narrow gap between the piston and the lateral surface or the flow over a radial seal of the piston.

Consequently, the reverse movement can take a relatively long time, whereby a quick sequence of cleaning processes is not possible or is possible only with reduced portions. Furthermore, such apparatuses can be negatively influenced in terms of their action and precision, for example by temperature-induced different changes in volume or hardness of individual components.

Moreover, internal leaks prevented exact volume dosing, in particular with the use of downstream nozzles with a very small throughflow. Surplus amounts of cleaning fluid flow through the apparatus by way of the leaks, whereby the structurally defined dosing volume is exceeded and the consumption is increased.

SUMMARY OF THE INVENTION

Against this background, an aspect of the invention is based on providing an improved generic apparatus, which permits exact portioning with reduced temperature dependency and in a cleaning sequence which is as quick as possible.

An aspect of the invention provides that the piston unit comprises a piston body 6 and a valve device which is arranged on the piston body and which ensures that the chamber is filled with the cleaning fluid during the reverse movement of the piston unit. In this way, rapid refilling of the chamber used for portioning during the return movement is made possible and the precision and efficiency are improved during the forward movement through avoidance of leaks.

An aspect of the invention furthermore provides that the valve device has a valve body which is arranged so as to be displaceable to a limited extent along the central axis relative to the piston body. This makes possible simple, reliable and automatic valve actuation through actuation of the pump for cleaning-fluid supply and of the part of the piston unit coupled thereto, separate valve control not being required.

For a particularly space-saving, inexpensive construction and reliable and efficient functioning, the valve body, according to the preferred embodiment, comprises a first valve head, which has a first closure body for closing off the inflow channel, and a second valve head, which is coupled to said first valve head and has a second closure body for closing off the outflow channel.

A preferred refinement of the invention provides that the first valve head 11 has a sealing surface which, when the piston body abuts against the valve head, hydraulically seals off the axial aperture, whereby internal leaks are avoided during the forward movement and precision and efficiency are increased.

An aspect of the invention furthermore provides that, for quick and temperature-independent filling of the chamber with cleaning fluid, the piston body has at least one axial aperture, through which, according to the preferred embodiment, the valve body extends for an effective space-saving design.

In order to ensure quick and unhindered filling of the chamber during the reverse movement of the piston unit, there is provided according to the preferred refinement of the invention a spring element which preloads the valve body counter to the actuation direction and consequently makes possible unhindered throughflow.

A preferred embodiment of the invention furthermore provides that the axial aperture is connected hydraulically to the chamber at all times, in particular by means of connecting channels provided at the piston body. In this way, internal hydraulic resistances are reduced and the switching speed of the valve device is increased.

An aspect of the invention also provides that, for a cost-effective and efficient reverse movement of the piston unit, there is arranged in the housing a compression spring which preloads the piston unit counter to the actuation direction and is compressed by the piston unit during forward movement.

In order to further increase the efficiency of the apparatus, the preferred embodiment of the invention furthermore provides that a normally closed, in particular pressure-controlled, check valve is arranged after the outflow channel in the flow direction and prevents cleaning fluid from being sucked into the chamber through the outflow channel.

BRIEF DESCRIPTION OF THE DRAWINGS

An aspect of the present invention will be discussed in more detail below on the basis of an exemplary embodiment. In this case:

FIG. 1A shows, in a sectional illustration, an embodiment according to the invention of the apparatus, with the piston unit in a non-actuated initial position.

FIG. 1B shows, in a sectional illustration, an enlarged detail view of the valve device in the configuration as per FIG. 1A.

FIG. 2A shows, in a sectional illustration, the embodiment as per FIG. 1 after displacement of a fixed portion of the cleaning fluid, with the piston unit in its actuated end position.

FIG. 2B shows, in a sectional illustration, an enlarged detail view of the valve device in the configuration as per FIG. 2A.

DETAILED DESCRIPTION OF THE PREFERRED EMBODIMENTS

FIGS. 1A and 1B

An apparatus 1 according to an aspect of the invention is designed so as to be substantially rotationally symmetrical about a central axis A and has an approximately sleeve-shaped housing 2 with a cavity 16, which is able to be filled with a cleaning fluid, and with a piston unit 9, which is movable in said cavity along the central axis A and delimits a chamber 3 in the cavity 16.

An inflow channel 7 which opens into the cavity 16 is connected hydraulically to a conveying device (not shown here) and serves for pressurized filling of the cavity 16 with cleaning fluid.

The piston unit 9 is sealed off radially with respect to the lateral surface 4 of the cavity 16 by a sealing element 28. An increase in the pressure in the inflow channel 7 gives rise to a positive pressure before the piston unit 9 in the actuation direction B in comparison with the pressure in the chamber 3, which is arranged after the piston unit 9. As a result of this pressure difference, the piston unit 9 is moved in a forward motion from the non-actuated initial position shown and is displaced in the actuation direction B up to the stop, into its actuated end position as per FIG. 2A. In the process, the piston unit 9 displaces a structurally determined portion of cleaning fluid from the chamber 3 through an outflow channel 8 to a spray nozzle (not shown) arranged downstream. During the forward movement, the volume displaced through the outflow channel 8 by the piston unit 9 is replenished in the cavity 16 from the inflow channel 7.

Furthermore, a compression spring 19 is compressed during the forward movement by the piston unit 9, which compression spring continuously preloads the piston unit 9 counter to the actuation direction B and serves as a restoring spring for moving the piston unit back into the initial position.

Arranged downstream of the outflow channel 8 is a check valve 20, which prevents cleaning fluid from flowing back from the hydraulic lines (not shown here) through the outflow channel 8 into the cavity 16. The check valve 20 is a normally closed, pressure-actuated one and, in the exemplary embodiment shown, comprises a tube-like elastic diaphragm 27 which is pulled over a transverse bore 26 into which the outflow channel 8 opens. When cleaning fluid is conveyed out of the chamber 3 through the outlet channel 8, the fluid pressure before the diaphragm 27 is increased, whereby the latter expands and opens up a gap for the cleaning fluid to flow through.

Within an aspect of the invention, the check valve may also be constructed differently, for example the diaphragm may be of slotted form for the purpose of reducing resistance, or a closure body preloaded by a spring element may be used.

The piston unit 9 has a valve device 5 which, firstly, selectively blocks or opens up a hydraulic axial aperture 15 through the piston unit 9, and also is configured to seal off or shut off the inflow channel 7 and the outflow channel 8.

In the preferred embodiment shown, the piston unit 9 has a piston body 6 with a continuous, radially centrally arranged axial aperture 15 which allows a flow of cleaning fluid through the piston unit 9 and through which a combined valve body 10 of the valve device 5 extends.

The valve body 10 has a first valve head 11 on the inflow side and has a second valve head 13 on the outflow side, which valve heads are, by means of a rod-like coupling element 23, coupled to one another or connected to one another.

The coupling element 23 runs through the axial aperture 15 and, in terms of its axial length, is configured such that the valve body 10 is slightly displaceable axially relative to the piston body 6. Here, a sealing surface 18 on the first valve head 11 and a radial collar 25 on the second valve head 13 form stops for the piston body 6 for limiting the axial displacement of the valve body 10.

In terms of its cross section, the coupling element 23 is configured such that a flow of cleaning fluid through the axial aperture 15 along the coupling element 23 is possible.

The first valve head 11 has an umbrella-like closure body 12, which has a sealing surface 18 on its side facing the piston body 6. In the non-actuated initial position of the piston unit 9, the closure body 12 is, by way of the compression spring 19, pressed by the piston body 6 against the mouth of the inflow channel 7 and sealingly closes off said mouth. Since the piston body 6 is simultaneously pressed against the sealing surface 18, the axial aperture 15 is consequently likewise sealingly closed off.

FIG. 2

FIGS. 2A and 2B illustrate the embodiment of the device 1 as per FIGS. 1A and 1B with the piston unit 9 in its actuated end position.

Starting from the non-actuated initial position according to FIG. 1, the pressure in the inflow channel 7 is increased through activation of a pump (not shown). This pressure presses the valve head 12 by way of the sealing surface 18 against the piston body 6 such that the axial aperture 15 remains closed off in a sealed manner. In the cavity 16, a positive pressure is built up in the inflow region, which positive pressure acts on the entire cross-sectional surface of the piston unit 9, moves the latter in forward motion in the actuation direction B counter to spring force of the compression spring 19, and in this way displaces the cleaning fluid from the chamber 3 into the outflow channel.

On the outflow side, the valve body 10 has the valve head 13, which is provided for closing off the outflow channel 8. For this purpose, an elastic closure body 14 which cooperates with a valve seat 29 is arranged on the valve head 12. In the exemplary embodiment shown, the closure body 14 is provided as an O-ring, wherein, within an aspect of the invention, further embodiments with an equivalent effect are of course permissible.

For reliable threading and centering in the outflow channel 8, the valve head 13 has a substantially conical tip.

During the forward movement, firstly the closure body 14 positions itself against the valve seat 29, whereby the movement of the valve body 10 is stopped and the outflow channel 8 is closed off with respect to the chamber 3. The piston body 6 is however still displaced slightly further in the actuation direction B relative to the valve body 10 until it abuts against a collar 25 on the valve head 13. In the process, the valve head 12 is lifted off from the piston body 6 and the axial aperture 15 is consequently opened up for throughflow with cleaning fluid. Connecting channels 30 ensure a hydraulic connection between the chamber 3 and the axial aperture 15 when the piston body 6 is in abutment against the collar 25 of the valve head 13.

As long as the pump is running and the hydraulic pressure from the inflow side to the piston unit 9 is maintained, the outflow channel 8 remains closed off. After deactivation of the pump, the piston unit 9 is moved by the pressure spring 19 in reverse motion, the chamber 3 being refilled by way of the axial aperture 15 in the process.

In order for the axial aperture 15 to be kept open at all times during the return movement so that the chamber 3 can be filled, a spring element 17 is arranged in the piston unit 9 between the piston body 6 and the valve body 10, which spring element preloads the valve body 10 with respect to the piston body 6 counter to the actuation direction B. Here, the spring element 17 is designed to be so weak that it cannot displace the valve body 10 with respect to the piston body 6 counter to the pump pressure acting on the inflow side during the forward movement with an activated pump, and it keeps the valve head 12 spaced apart from the piston body 6 only after deactivation of the pump during the reverse movement of the piston unit 9.

LIST OF REFERENCE SIGNS

1 Apparatus
2 Housing
3 Chamber
4 Lateral surface
5 Valve device
6 Piston body
7 Inflow channel
8 Outflow channel
9 Piston unit
10 Valve body
11 First valve head
12 First closure body
13 Second valve head
14 Second closure body
15 Axial aperture
16 Cavity
17 Spring element
18 Sealing surface
19 Compression spring
20 Check valve
21 Inlet connector
22 Outlet connector
23 Coupling element
24 Latching element
25 Collar
26 Transverse bore
27 Diaphragm
28 Sealing element
29 Valve seat
30 Connecting channel
A Central axis
B Actuation direction

The invention claimed is:

1. An apparatus for volume-controlled portioning of cleaning fluid, having a housing, having a cavity which is arranged in the housing and is able to be filled with the cleaning fluid, having at least one inflow channel which opens into the cavity and serves for feeding cleaning fluid into the cavity, having at least one outflow channel which opens into the cavity and serves for conveying cleaning fluid out of the cavity, and having a piston unit which is able to be moved in the cavity along a central axis and delimits a chamber in an actuation direction in the cavity and, from a non-actuated initial position, displaces the cleaning fluid from the chamber into the outflow channel during a forward movement in a pressure difference-actuated manner, and is moved back into the non-actuated initial position during a reverse movement, wherein the piston unit comprises a piston body and at least one valve device which is arranged on the piston body to close off the at least one inflow channel and which ensures that the chamber is filled with the cleaning fluid during the reverse movement of the piston unit, wherein the valve device has a valve body which is displaceable to a limited extent along the central axis relative to the piston body.

2. The apparatus as claimed in claim 1, wherein the valve body has a first valve head, which has a first closure body for closing off the inflow channel, and a second valve head, which has a second closure body for closing off the outflow channel, wherein the two valve heads are coupled to one another.

3. The apparatus as claimed in claim 1, wherein the piston unit has a spring element which preloads the valve body counter to the actuation direction.

4. The apparatus as claimed in claim 1, wherein the piston body has at least one axial aperture, which serves for filling of the chamber with cleaning fluid.

5. The apparatus as claimed in claim 4, wherein the valve body extends through at least one the axial aperture.

6. The apparatus as claimed in claim 4, wherein the axial aperture is provided so as to be connected hydraulically to the chamber at all times.

7. The apparatus as claimed in claim 4, wherein the first valve head has a sealing surface which, when the piston body abuts against the first valve head, hydraulically seals off the axial aperture.

8. The apparatus as claimed in claim 7, wherein, there is arranged in the housing a compression spring which preloads the piston unit counter to the actuation direction and is compressed by the piston unit during forward movement.

9. The apparatus as claimed claim 1, wherein a normally closed check valve is arranged after the outflow channel in a cleaning-fluid conveying direction and is set in an open state in a pressure difference-controlled manner when cleaning fluid is conveyed out of the chamber 3.

10. The apparatus as claimed in claim 2, wherein the piston unit has a spring element which preloads the valve body counter to the actuation direction.

11. The apparatus as claimed in claim 5, wherein the at least one axial aperture is provided so as to be connected hydraulically to the chamber at all times.

* * * * *